(12) United States Patent
Lok et al.

(10) Patent No.: US 7,732,500 B2
(45) Date of Patent: Jun. 8, 2010

(54) HIGH COBALT CONTENT, HIGH COBALT SURFACE AREA CATALYSTS, PREPARATION AND USE THEREOF

(75) Inventors: Cornelis Martinus Lok, Cleveland (GB); John West, Cleveland (GB)

(73) Assignee: Johnson Matthey PLC, London (GB)

( * ) Notice: Subject to any disclaimer, the term of this patent is extended or adjusted under 35 U.S.C. 154(b) by 512 days.

(21) Appl. No.: 11/661,231

(22) PCT Filed: Aug. 19, 2005

(86) PCT No.: PCT/GB2005/003235

§ 371 (c)(1),
(2), (4) Date: Feb. 26, 2007

(87) PCT Pub. No.: WO2006/021754

PCT Pub. Date: Mar. 2, 2006

(65) Prior Publication Data

US 2007/0259974 A1 Nov. 8, 2007

(30) Foreign Application Priority Data

Aug. 25, 2004 (GB) .................................. 0418934.6

(51) Int. Cl.
*B01J 23/00* (2006.01)
*B01J 23/75* (2006.01)
*B01J 35/10* (2006.01)
*B01J 37/03* (2006.01)
*C10G 2/00* (2006.01)

(52) U.S. Cl. ...................... 518/715; 502/327; 502/355; 502/415; 502/439

(58) Field of Classification Search ................. 518/715; 502/327, 355, 415, 439
See application file for complete search history.

(56) References Cited

U.S. PATENT DOCUMENTS 3,988,263 A * 10/1976 Hansford .................... 502/337
3,997,582 A * 12/1976 Khera ........................ 518/715
4,077,995 A * 3/1978 Khera ........................ 518/715
4,124,629 A * 11/1978 Hansford .................... 518/715
4,396,539 A * 8/1983 Sapienza et al. ............ 502/326
4,397,964 A * 8/1983 Pargeter et al. ............. 518/713
5,945,458 A * 8/1999 Barry ........................ 518/715
6,191,066 B1 * 2/2001 Singleton et al. ............ 502/332
6,235,677 B1 * 5/2001 Manzer et al. .............. 502/232
6,362,239 B1 * 3/2002 Buess et al. ................. 518/715
6,465,530 B2 * 10/2002 Roy-Auberger et al. ..... 518/715
6,534,436 B2 * 3/2003 Lok et al. ................... 502/260
6,586,481 B2 * 7/2003 Pederzani et al. ........... 518/715
6,730,708 B2 * 5/2004 Raje et al. ................... 518/715
6,835,690 B2 * 12/2004 Van Berge et al. .......... 502/328
6,927,190 B2 * 8/2005 Lok et al. ................... 502/327
6,977,273 B2 * 12/2005 Roy-Auberger et al. ..... 518/715
7,253,136 B2 * 8/2007 Mauldin et al. ............. 502/327
7,368,625 B2 * 5/2008 Lok et al. ................... 585/733
2001/0031793 A1 * 10/2001 Singleton et al. ............ 518/715

FOREIGN PATENT DOCUMENTS

| EP | 0 496 448 A1 | 7/1992 |
|---|---|---|
| WO | WO-01/87480 A1 | 11/2001 |
| WO | WO-2004/058401 A1 | 7/2004 |

OTHER PUBLICATIONS

Alexander A. Khassin et al., "Cobalt-aluminum co-precipitated catalysts and their performance in the Fischer-Tropsch synthesis," *Journal of Molecular Catalysis A: Chemical*, 168 (2001), pp. 193-207.
M. Alderliesten et al., "A Nomenclature for Mean Particle Diameters," *Anal. Proc.*, vol. 21, May 1984, pp. 167-172.
Operators Manual for Micromeretics ASAP 2010 Chemi System v 2.01, Appendix C, Part No. 201-42808-01, Oct. 1996.

* cited by examiner

*Primary Examiner*—Cam N Nguyen
(74) *Attorney, Agent, or Firm*—RatnerPrestia

(57) ABSTRACT

A particulate catalyst comprises an intimate mixture of cobalt and aluminum compounds at an atomic ratio in the range 10:1 to 2:1 (Co:Al), which when reduced at 425° C., has a cobalt surface area as measured by hydrogen chemisorption at 150° C. of at least 30 m²/g of catalyst. The catalyst is prepared by sequential precipitation of cobalt with aluminum ions in the presence of an alkaline precipitation agent. The catalyst may be used for the hydrogenation of unsaturated compounds or the Fischer-Tropsch synthesis of hydrocarbons.

19 Claims, No Drawings

HIGH COBALT CONTENT, HIGH COBALT SURFACE AREA CATALYSTS, PREPARATION AND USE THEREOF

This application is the U.S. National Phase application of PCT International Application No. PCT/GB2005/003235, filed Aug. 19, 2005, and claims priority of British Patent Application No. 0418934.6, filed Aug. 25, 2004.

FIELD OF THE INVENTION

The application relates to cobalt-alumina catalysts, as well as to the preparation and use thereof.

BACKGROUND OF THE INVENTION

Supported cobalt catalysts wherein the cobalt is in its elemental or reduced state are well known and find use in many reactions involving hydrogen such as hydrogenation reactions, and the Fischer-Tropsch synthesis of hydrocarbons. The activity of the catalysts is believed to be directly proportional to the cobalt surface area of the reduced catalysts, but in order to achieve high cobalt surface areas, the cobalt should be well dispersed on the support. Furthermore, to minimize reactor volume, the catalyst should preferably have as high a cobalt content as possible. High cobalt contents also offer improved efficiency in catalyst recycle and regeneration. However, as the cobalt content of a catalyst increases above 20% by weight (on reduced catalyst) the cobalt becomes more difficult to disperse resulting in lower cobalt surface areas. Cobalt is a relatively expensive metal and therefore there is a desire to improve the cobalt dispersion (expressed as cobalt surface area per gram catalyst).

Preparation of cobalt-alumina catalysts has heretofore typically been by impregnation of cobalt compounds into 'pre-formed' alumina materials or by precipitation of cobalt compounds from solution in the presence of alumina powders or extrudates, followed usually by a heating step and then, prior to use, reduction of the resulting cobalt compounds to elemental form using hydrogen.

Alternatively cobalt-alumina catalysts may be prepared by simultaneous co-precipitation of cobalt (Co) and aluminium (Al) compounds by addition of a base. Khassin et al describe the co-precipitation of $Co^{2+}$ and $Al^{3+}$ at ratios of 1:1, 1:1.3 and 1:2 to yield hydrotalcite-containing materials. Upon calcination and reduction under hydrogen at 470-480° C. these catalysts were of low activity in the Fischer-Tropsch synthesis of hydrocarbons (see *Journal of Molecular Catalysis A: Chemical,* 168, 2001, 193-207).

SUMMARY OF THE INVENTION

We have found surprisingly, that new high cobalt content, high cobalt surface area catalysts suitable for the hydrogenation of unsaturated compounds or in the Fischer-Tropsch synthesis of hydrocarbons may be obtained by the sequential precipitation of cobalt and aluminate ions from solution.

The present invention provides a particulate catalyst comprising an intimate mixture of cobalt and aluminium compounds having cobalt and aluminium at an atomic ratio in the range 10:1 to 2:1 (Co:Al), which when reduced at 425° C., has a cobalt surface area as measured by hydrogen chemisorption at 150° C. of at least 30 $m^2$/g of catalyst.

DETAILED DESCRIPTION OF THE INVENTION

Preferably the atomic ratio of cobalt to aluminium of the catalysts is in the range 5:1 and 2.5:1, more preferably between 4:1 and 3:1. Despite the high cobalt contents compared to the impregnated or simultaneous co-precipitated catalysts previously known, the catalysts retain high cobalt surface areas upon reduction. For example, stable catalysts with cobalt contents $\geq$60% wt particularly $\geq$75% wt (reduced catalyst) may be prepared. It is believed that in order to obtain the very high cobalt surface areas observed at these Co levels, the amount of reduced cobalt is $\geq$60%, preferably $\geq$70%, of the cobalt present in the unreduced catalyst. An advantage of such high cobalt contents is that catalyst recovery and recycling to obtain the cobalt once the catalyst is spent becomes economically viable. This leads also to the further benefit of a reduced waste-disposal burden.

The catalyst composition, which may also be termed catalyst precursor prior to reduction, comprises intimately mixed cobalt and aluminium compounds in which cobalt compounds may be supported on cobalt-aluminium compounds. Upon reduction the cobalt compounds are readily reduced whereas the cobalt-aluminium compounds are more difficult to reduce. The resulting structure is different to that obtainable by impregnation or simultaneous co-precipitation techniques and provides improved catalyst performance. It is believed that prior to activation at least a major portion of the aluminium in the catalysts of the present invention may be in the form of one or more cobalt-aluminium compounds. By major portion we mean >50% of the aluminium atoms. Preferably >75%, more preferably substantially all of the aluminium has reacted to form cobalt aluminium compounds. This is in contrast to the supported catalysts of the prior art wherein it is believed that a minor part of the aluminium is in the form of cobalt-aluminium compounds and a major part is alumina. The presence of cobalt-aluminium compounds may be determined using vibrational spectroscopy, e.g. Raman or Infra-red spectroscopy. Alternatively the presence of an intimate mixture of cobalt-aluminium compounds may be determined using a temperature-programmed reduction (TPR) wherein reduction with hydrogen is performed at 150-1000° C. and a TCD signal recorded that shows a characteristic peak for, e.g. Co—Al hydrotalcite structures in the range 400-800° C.

The particle size of the catalysts expressed as surface-weighted mean diameter D[3,2] is preferably in the range 5-100 µm (microns). More preferably the particle size is in the range 5-30 microns, especially 10-20 microns. Larger particles may be prepared by agglomeration. The term surface-weighted mean diameter D[3,2], otherwise termed the Sauter mean diameter, is defined by M. Alderliesten in the paper "A Nomenclature for Mean Particle Diameters"; Anal. Proc., vol 21, May 1984, pages 167-172, and is calculated from the particle size analysis which may conveniently be effected by laser diffraction for example using a Malvern Mastersizer.

The catalysts of the present invention have a porous structure with pore diameters preferably of 50-500 angstroms or larger, depending on the Co:Al ratio. For example, at a Co:Al atomic ratio of 5:1, the pore diameters of the catalyst prior to reduction may be about 200-250 angstroms. The pore volume of the catalyst prior to reduction is preferably >0.3 cm$^3$/g, more preferably >0.4 cm$^3$/g of catalyst.

The BET surface area of the catalyst prior to reduction is preferably between 50 and 250 m$^2$/g of catalyst, more preferably >90 m$^2$/g. The BET surface area and pore volume measurements are suitably determined using nitrogen desorption using methods known to persons skilled in the art. The average pore diameter may be calculated from (4× pore volume)/BET surface area.

In addition to cobalt and aluminium compounds, the catalyst may comprise one or more suitable additives and promoters useful in hydrogenation reactions and/or Fischer-Tropsch catalysis. For example, the catalysts may comprise one or more additives that alter the physical properties and/or promoters that effect the reducibility or activity or selectivity of the catalysts. Suitable additives are selected from compounds of molybdenum (Mo), nickel (Ni), copper (Cu), iron (Fe), manganese (Mn), titanium (Ti), zirconium (Zr), lanthanum (La), cerium (Ce), chromium (Cr), magnesium (Mg) or zinc (Zn). Suitable promoters include rhodium (Rh), iridium (Ir), ruthenium (Ru), rhenium (Re), platinum (Pt) and palladium (Pd). Additives and/or promoters may be incorporated into the catalysts by addition of suitable compounds such as metal salts, e.g. metal nitrates or metal acetates, or suitable metal-organic compounds, such as metal alkoxides or metal acetylacetonates, to the reaction mixtures.

The invention further provides a process for the preparation of a particulate catalyst comprising an intimate mixture of cobalt and aluminium compounds having cobalt and aluminium at an atomic ratio in the range 10:1 to 2:1 (Co:Al), which when reduced at 425° C., has a cobalt surface area as measured by hydrogen chemisorption at 150° C. of at least 30 m$^2$/g of catalyst comprising the steps of;
(i) precipitating an insoluble cobalt compound from an aqueous solution of a cobalt salt with an excess alkaline precipitating agent,
(ii) adding a soluble aluminium compound
(iii) ageing the resulting precipitate in suspended form, and
(iv) recovering and drying the catalyst composition.

Hence, one or more insoluble cobalt compounds is precipitated from an aqueous solution of a cobalt salt with an excess alkaline precipitating agent, which precipitate is subsequently allowed to age in suspended form and is then collected, wherein, after the cobalt ions have been precipitated, a soluble aluminium compound is added. The soluble aluminium compound can be added as a solution but also as undissolved crystals. The soluble aluminium compound being added after the cobalt ions have been substantially precipitated is e.g. aluminium nitrate, sodium aluminate or alumina that dissolves at least partly in the excess alkali. Preferably the soluble aluminium compound is aluminium nitrate or sodium aluminate, particularly sodium aluminate.

By forming the aluminium 'support' in-situ by the sequential precipitation method described herein, rather than using an alumina powder, pellet, extrudate or the like, the present invention allows a degree of control over the resulting catalyst physical properties not previously possible. In particular the separate manipulation of the precipitation and ageing steps allows a degree of control not previously provided. For example, by increasing or decreasing the temperature during the ageing step, the pore size of the catalyst may be controlled. Furthermore, the particle size of the catalyst may be controlled by the degree of agitation of the ageing mixture.

After precipitation and ageing according to the invention, the precipitate is recovered from the liquid e.g. by centrifugation or filtration, usually washed, and dried. Subsequent activation of the catalyst is typically performed by reduction of the cobalt compounds with a hydrogen-containing gas at an elevated temperature using methods known to those skilled in the art. An advantage of this preparative method is that calcination of the catalyst composition is not required and accordingly that reduction of the dried precipitate leads directly to the high surface area catalysts. However, in some cases it may be desirable to calcine the dried catalyst precursor composition at temperatures in the range 200-800° C., preferably 200-600° C., more preferably 200-400° C. Calcination may be under an inert gas such as nitrogen or argon or may be in air to effect oxidation of the cobalt and/or aluminium compounds prior to activation.

Cobalt compounds which can be used as starting material for the catalysts are water-soluble cobalt compounds such as nitrate, sulphate, acetate, chloride and formate. The solutions which are charged to the precipitation reactor preferably contain between 10 and 100, more preferably 10 and 80 grams cobalt per liter; especially preferred are solutions which contain between 25 and 60 grams cobalt per liter.

If desired, suitable compounds of additives and/or promoters may be added to the solution of cobalt compounds prior to precipitation.

Alkaline precipitation agents may be alkali metal hydroxide, alkali metal carbonate, alkali metal bicarbonate, the corresponding ammonium compounds and mixtures of the above-mentioned compounds. Ammonium carbonate may also be used. The concentration of the alkaline solution which is fed into the precipitation reactor is preferably between 20 and 300 grams alkaline material (calculated as anhydrous material) per liter (in as far as the solubility allows this), more particularly between 50 and 250 grams per liter.

Preferably the precipitant solution comprises an alkali metal carbonate, particularly $Na_2CO_3$, more preferably the precipitant comprises NaOH and $Na_2CO_3$ with a mole ratio of NaOH:$Na_2CO_3 \leq 1:1$. Where a mixture of alkali metal hydroxide and alkali metal or ammonium carbonate is used as precipitation agent, the cobalt is initially thought to precipitate in a pre-hydrotalcite-like structure that readily accepts aluminium cations from solution thereby forming stable cobalt-aluminium hydrotalcite-like structures during the ageing step.

It is convenient to use both solutions (of cobalt compound and alkaline compound) in almost the same concentrations (expressed in equivalents), so that approximately the same volumes can be reacted.

The cobalt-containing solution and the alkaline solution are added in such amounts per unit of time that an excess of alkaline compound is present during the precipitation step, so that pH is preferably in the range 7-11, more preferably 7-10.

The precipitation reactor preferably has such dimensions with respect to the amounts of liquid pumped in that short average residence times can be obtained. Typically, average residence times of between 0.1 sec. and 10 minutes, preferably between 0.2 sec. an 4.5 minutes may be used in the precipitation reactor.

In a preferred embodiment, in which the precipitation step (step 1) is carried out continuously, the amounts of solutions fed into the precipitation reactor are controlled by measuring, optionally continuously, the normality or pH of the reactor effluent.

The temperature at which the precipitation takes place can be controlled by adjusting the temperatures of the liquids fed into the precipitation reactor. Preferably the temperature is maintained below 90° C., more preferably below 50° C., most preferably below 30° C. The required vigorous agitation of the liquid in the precipitation reactor preferably takes place with a mechanical energy input of between 5 and 2000 watts per kg of solution. More preferably the agitation takes place with a mechanical energy input of 100 to 2000 watts per kg of solution. The reaction mixture obtained from the precipitation reactor goes immediately thereafter to a stirred post-reactor (ageing reactor) of a significantly higher capacity in which the suspension is agitated and aged. At this stage, the soluble aluminium compound is added. The amount of aluminium compound added is 0.1 to 0.5 mole aluminium ions per gram atom of cobalt in the suspension.

If desired, a soluble silicate compound may also be added with the aluminium source following precipitation of the cobalt. Suitable soluble silicate compounds are e.g. waterglass, including neutral waterglass and potassium silicate. The amount of silicate added may be from 0.05-1 mole per gram atom of cobalt, preferably between 0.1 and 0.5 mole.

Additives and/or and promoters may also be added at this stage in addition to, or as an alternative to adding them to the cobalt solution prior to precipitation. Suitable amounts of additives and/or promoters are from 0.5 to 10% wt, calculated on the weight of cobalt in the unreduced catalyst.

Preferably the liquid in the ageing reactor during the ageing step is kept at a temperature between 10 and 100° C., preferably 40° C. and 100° C. In a continuous process where the precipitant consists of sodium carbonate, the temperature is preferably in the range 40-60° C.

The pH in the ageing reactor will vary during the ageing step. The average pH in the ageing reactor is preferably maintained in the range 6-11, more preferably 7-10, most preferably 8-10.

The precipitation step and also the maturing step can be carried out batch-wise (i.e. discontinuously), continuously and semi-continuously (e.g. according to the cascade method).

The ageing step can be carried out in one or more reactors, the (total) average residence time being maintained between 10 and 180 minutes, preferably between 30 and 150 minutes, more preferably between 30 and 70 minutes. If more than one ageing reactor is used the conditions may be the same or different. Alternatively the product may be fully aged in one reactor then passed to a storage vessel under conditions where no further ageing takes place. By 'fully aged' we mean that substantially all the aluminium compound has been precipitated, preferably in the form of cobalt aluminium compounds. For example the ageing reactor may discharge product, in which substantially all the aluminium has reacted to form cobalt aluminium compounds, into a stirred tank operated at room temperature (ca. 20° C.).

The present process Involving separate precipitation and ageing steps results in a catalyst precursor of particle size and particle size distribution more suitable for filtration than a simultaneously co-precipitated precursor. Improved filterability is of considerable importance in both hydrogenation processes and the Fischer-Tropsch synthesis of hydrocarbons where more efficient catalyst recovery is highly desirable.

The solid material recovered from the ageing reactor is preferably washed with water; optionally containing some alkali or a surface active material, e.g. a non-ionic surfactant. Also, an organic solvent, e.g. acetone can be advantageously used during washing. Drying preferably takes place with hot air below 200° C. Spray-drying is preferred but freeze-drying is also suitable.

Before the catalysts are activated by reduction, the dried composition may, if desired, be formed into shaped units suitable for the process for which the catalyst is intended, using methods known to those skilled in the art. The shaped units may be spheres, pellets, cylinders, rings, or multi-holed pellets, which may be multi-lobed or fluted, e.g. of cloverleaf cross-section.

Reduction may be performed by passing a hydrogen-containing gas such as hydrogen synthesis gas or a mixture of hydrogen with nitrogen, methane or other inert gas over the dried catalyst composition at elevated temperature, for example by passing the hydrogen-containing gas over the composition at temperatures in the range 150-600° C., preferably 250-600° C., alternatively 150-500° C., preferably 300-500° C. for between 1 and 24 hours. Reduction may be performed at atmospheric or higher pressures up to about 25 bar.

Catalysts in the reduced state can be difficult to handle as they can react spontaneously with oxygen in air, which can lead to undesirable self-heating and loss of activity. Consequently reduced catalysts suitable for hydrogenation reactions may be passivated following reduction with an oxygen-containing gas, often air or oxygen in carbon dioxide and/or nitrogen. Passivation provides a thin protective layer sufficient to prevent undesirable reaction with air, but which is readily removed once the catalyst has been installed in a hydrogenation process by treatment with a hydrogen-containing gas. For catalysts suitable for Fischer-Tropsch processes, passivation is not preferred and the reduced catalyst is preferably protected by encapsulation of the reduced catalyst particles with a suitable barrier coating. In the case of a Fischer-Tropsch catalyst, this may suitably be a FT-hydrocarbon wax. Alternatively, the catalyst can be provided in the unreduced state and reduced in-situ with a hydrogen-containing gas.

Whichever route is chosen, the catalysts of the present invention provide very high cobalt surface areas. The catalysts, when reduced at 425° C., have a cobalt surface area of at least 30 $m^2/g$ of (reduced) catalyst as measured by the $H_2$ chemisorption technique described herein. Preferably the cobalt surface area is greater than 35 $m^2/g$ (reduced) catalyst, more preferably at least 40 $m^2/g$ (reduced) catalyst.

The cobalt surface area is determined by $H_2$ chemisorption. The preferred method is as follows; approximately 0.2 to 0.5 g of sample material is firstly degassed and dried by heating to 140° C. at 10° C./min in flowing helium and holding it at 140° C. for 60 mins. The degassed and dried sample is then reduced by heating it from 140° C. to 425° C. at a rate of 3° C./min under a 50 ml/min flow of hydrogen and then holding it under the same hydrogen flow, at 425° C. for 6 hours. Following reduction and under vacuum, the sample is heated up to 450° C. at 10° C./min and held under these conditions for 2 hours. The sample is then cooled to 150° C. and held for a further 30 minutes under vacuum. The chemisorption analysis is carried out at 150° C. using pure hydrogen gas. An automatic analysis program is used to measure a full isotherm over the range 100 mmHg up to 760 mmHg pressure of hydrogen. The analysis is carried out twice; the first measures the "total" hydrogen uptake (i.e. includes chemisorbed hydrogen and physisorbed hydrogen) and immediately following the first analysis the sample is put under vacuum (<5 mm Hg) for 30 mins. The analysis is then repeated to measure the physisorbed uptake. A linear regression may then be applied to the "total" uptake data with extrapolation back to zero pressure to calculate the volume of gas chemisorbed (V).

Cobalt surface areas were calculated in all cases using the following equation;

$$\text{Co surface area} = (6.023 \times 10^{23} \times V \times SF \times A)/22414$$

where V=uptake of $H_2$ in ml/g
SF=Stoichiometry factor (assumed 2 for $H_2$ chemisorption on Co)
A=area occupied by one atom of cobalt (assumed 0.0662 $nm^2$)

This equation is described in the Operators Manual for the Micromeretics ASAP 2010 Chemi System V 2.01, Appendix C, Part No. 201-42808-01, October 1996.

The catalysts may be used for hydrogenation reactions and for the Fischer-Tropsch synthesis of hydrocarbons.

Typical hydrogenation reactions include the hydrogenation of aldehydes and nitrites to alcohols and amines respectively, and the hydrogenation of cyclic aromatic compounds or unsaturated hydrocarbons. The catalysts of the present invention are particularly suitable for the hydrogenation of unsaturated organic compounds particularly oils, fats, fatty acids and fatty acid derivatives like nitrites. Such hydrogenation reactions are typically performed in a continuous or batch-wise manner by treating the compound to be hydrogenated with a hydrogen-containing gas under pressure in an autoclave at ambient or elevated temperature in the presence of the cobalt-catalyst, for example the hydrogenation may be carried out with hydrogen at 80-250° C. and a pressure in the range $0.1$-$5.0 \times 10^6$ Pa.

The Fischer-Tropsch synthesis of hydrocarbons is well established. The Fischer-Tropsch synthesis converts a mixture of carbon monoxide and hydrogen to hydrocarbons. The mixture of carbon monoxide and hydrogen is typically a synthesis gas having a hydrogen:carbon monoxide ratio in the range 1.7-2.5:1. The reaction may be performed in a continuous or batch process using one or more stirred slurry-phase reactors, bubble-column reactors, loop reactors or fluidised bed reactors. The process may be operated at pressures in the range 0.1-10 Mpa and temperatures in the range 150-350° C. The gas-hourly-space velocity (GHSV) for continuous operation is in the range 100-25000 $hr^{-1}$. The catalysts of the present invention are of particular utility because of their high cobalt surface areas/g catalyst.

EXAMPLES

The invention will now be further described by reference to the following examples.

Example 1

Preparation of Catalysts

Al:Co molar ratio=0.21:1. Aqueous solutions of $Co(NO_3)_2$ hydrate (35 g Co/liter) and a $Na_2CO_3$ anh. (67 g/liter)/NaOH (25 g/liter) mixture were continuously pumped at flow rates of respectively 1500 and 860 ml/hour into a vigorously stirred precipitation reactor, where cobalt hydroxide/carbonate was precipitated at a temperature of 35° C. The pH of the suspension in this reactor was 9.5. In this precipitation reactor (volume 100 ml), the suspension had an average residence time of 0.5 min. The suspension was then transferred continuously to an ageing reactor (volume 5000 ml) wherein the temperature was 70° C. Simultaneously, an amount of aluminium ions was continuously dosed into this reactor, as an aqueous solution of sodium aluminate (10 g Al/liter), at a rate of 490 ml/hour. In addition, 1150 ml/hour of water was dosed into this reactor. The suspension was subsequently transferred continuously to a second ageing reactor in which the temperature was 60° C.

The pH of the suspension in the first ageing reactor was 9.5 and in the second ageing reactor 9.5. The volume of the liquid in the first and second ageing reactor was kept constant.

The ageing was continued until at least a major portion of the aluminium formed cobalt-aluminium compounds. The ageing step was terminated and the suspension from the second ageing reactor filtered. The filtration rate was about 1-liter/min. The filter cake thus obtained washed with distilled water. The washed cake was spray dried. The cobalt surface area was determined on the reduced catalyst by hydrogen chemisorption as described above. The particle size of the catalyst prior to reduction was measured using a Malvern Mastersizer™. The BET surface area and pore volume for the un-reduced and reduced catalysts were measured by nitrogen physisorption using methods known in the art. The pore volume was determined using the desorption branch and pore diameter was calculated from (4× pore volume)/BET surface area. The results are given in Table 1.

Comparative Example A

In accordance with the procedure described in Example 1, a catalyst was prepared using an Al/Co atomic ratio of 0.02 by using a sodium aluminate solution of 1 g Al/liter. The results are given in Table 1.

TABLE 1

| Catalyst | Example 1 | Comparative A |
|---|---|---|
| Co content unreduced catalyst (% wt) | 44.3 | 36.6 |
| Co content reduced catalyst (% wt) | 82.0 | 98.9 |
| Co surface area ($m^2$/g reduced catalyst) | 42.0 | 11.2 |
| Co surface area ($m^2$/g cobalt in reduced catalyst) | 51.2 | 11.3 |
| BET surface area un-reduced catalyst ($m^2$/g) | 96.8 | NM |
| BET surface area reduced catalyst ($m^2$/g) | 95.7 | NM |
| Pore Volume un-reduced catalyst ($cm^3$/g) | 0.51 | NM |
| Pore Volume reduced catalyst ($cm^3$/g) | 0.36 | NM |

TABLE 1-continued

| Catalyst | Example 1 | Comparative A |
|---|---|---|
| Average Pore Diameter un-reduced catalyst (Angstroms) | 211 | NM |
| Average Pore Diameter of reduced catalyst (Angstroms) | 150 | NM |
| Particle Size un-reduced catalyst (Microns) | | |
| D(v, 0.1) | 4.0 | 2.7 |
| D(v, 0.5) | 12.6 | 13.3 |
| D(v, 0.9) | 23.1 | 28.8 |

NM = not measured

Example 2

Preparation of Catalysts

The catalyst preparation according to Example 1 was repeated with variation in the Co:Al ratio and pH in the reaction and ageing vessels. The analytical results were as follows;

| Catalyst | 2a | 2b | 2c | 2d | 2e |
|---|---|---|---|---|---|
| Al:Co ratio | 0.23 | 0.21 | 0.22 | 0.22 | 0.33 |
| pH precipitation reactor | 8.1 | 7.9 | 10.3 | 8.0 | 7.0 |
| pH ageing vessel 1 | 8.3 | 8.0 | 10.6 | 8.9 | 9.2 |
| pH ageing vessel 2 | 8.3 | 8.1 | 10.6 | 8.9 | 9.2 |
| Co content (wt %) unreduced catalyst | 44.5 | 45.2 | 44.6 | 44.3 | 41.3 |
| Co content (wt %) reduced catalyst | 78.8 | 80.4 | 77.3 | 76.0 | 76.1 |
| Co surface area (m$^2$/g cobalt) in reduced catalyst) | 58.1 | 54.7 | 58.3 | 43.7 | 61.5 |
| Co surface area (m$^2$/g reduced catalyst) | 45.8 | 44.0 | 45.1 | 33.2 | 46.8 |

-continued

| Catalyst | 2a | 2b | 2c | 2d | 2e |
|---|---|---|---|---|---|
| BET surface area (m$^2$/g) unreduced catalyst | 128.5 | 146.6 | 116.0 | 103.0 | 92.8 |
| Particle Size (Microns) un-reduced catalyst D50 (vol) | 10.0 | 13.2 | 12.7 | 10.8 | 11.1 |

The highest Co surface area was achieved for a Co/Al atomic ratio of 3:1.

Example 3

Preparation of Catalysts

An aqueous solutions of cobalt nitrate and an aqueous precipitant solution comprising NaOH/ and/or Na$_2$CO$_3$ were continuously pumped at flow rates of respectively 1500 and 860 ml/hour into a vigorously stirred precipitation reactor (upto 1500 rpm), where cobalt hydroxide/carbonate was precipitated at a temperature of 20-45° C. In this precipitation reactor (volume ca. 15 ml), the suspension had an average residence time of ca. 0.5 min. The suspension was then transferred continuously to a stirred ageing reactor (volume 5000 ml, stirred 100-450 rpm), which allowed an ageing time of 75 to 25 minutes. (Alternatively a 3000 ml vessel was used in some experiments). The temperature of the ageing reactor was controlled by means of a thermostatically-controlled water bath. Simultaneously, an amount of aluminium ions was continuously dosed into this reactor, as an aqueous solution of sodium aluminate. The suspension was subsequently transferred continuously to a non-stirred storage tank at room temperature (ca 20° C.). The suspension from the storage tank was subsequently washed with 1500 ml of demineralised water and filtered. The filter cake thus obtained was dried, at 110° C. overnight or by spray drying. The cobalt surface area was determined on the reduced catalyst by hydrogen chemisorption as described above.

a) Effect of pH. In a first series of experiments the pH in the ageing reactor was varied by using different amounts of sodium carbonate and sodium hydroxide in the precipitating agent solution, at an Al:Co ratio of 0.3 with 70° C. ageing for 70 minutes. (0.0 indicates that all the precipitant was sodium carbonate and 1.0 indicates that the precipitant was 50:50 (molar) sodium hydroxide and sodium carbonate. The results are as follows;

| pH | NaOH/Na$_2$CO$_3$ Molar ratio | Dry Method | BET SA m$^2$/g | Pore Volume cm$^3$/g | Pore Diameter (Angstroms) | Co Surface area (m$^2$/g reduced catalyst) |
|---|---|---|---|---|---|---|
| 6.5 | 0.0 | Oven | 136.1 | 0.47 | 138 | 32.8 |
| 6.5 | 0.5 | Spray dry | 150.5 | 0.54 | 144 | 44.2 |
| 7.7 | 0.75 | Spray dry | 101.3 | 0.38 | 150 | 43.4 |
| 9.8 | 1.0 | Spray dry | 153.8 | 0.66 | 172 | 45.2 |

All the catalysts gave Co surface areas >30 m$^2$/g reduced catalyst and the results show that increasing pH by increasing NaOH concentration in the precipitating agent solution led to higher cobalt surface areas. Preferably the molar ratio of NaOH/Na$_2$CO$_3$ was ≧0.5:1, more preferably 1:1 and the pH was 8-10.

b) Effect of Al:Co Ratio. A series of experiments was run with different amounts of Al and Co solution with an ageing temperature of ca 60° C. for 70 minutes. The precipitated catalyst precursors were all oven dried. Comparative examples (marked*) were prepared at lower Co contents (Co:Al=1.5:1 and 1.02:1) which showed both lower Cobalt surface areas and lower BET surface areas than the catalysts of the invention. The results are as follows;

| Al/Co (mol/mol) | Ageing Temp (° C.) | Ageing pH | NaOH/Na$_2$CO$_3$ molar ratio | BET SA m$^2$/g | Pore Vol. cm$^3$/g | Pore diameter (Angstroms) | Co SA m$^2$/g reduced catalyst |
|---|---|---|---|---|---|---|---|
| 0.30 | 60 | 6.1 | 0 | | | | 42.6 |
| *0.66 | 62 | 6.4 | 0 | 64.3 | 0.40 | 249 | 26.0 |
| *0.98 | 62 | 7.0 | 0 | 74.5 | 0.46 | 247 | 23.4 | c) Effect of Ageing temperature. A series of experiments was run at Al:Co=0.3 and with different ageing reactor temperatures/times. The pH during ageing was low because sodium carbonate was used as the sole precipitant. The results are as follows;

| Ageing Temp. (° C.) | Ageing time (mins) | Dry Method | pH | NaOH/Na$_2$CO$_3$ | BET SA m$^2$/g | Pore Volume cm$^3$/g | Pore Diameter (Angstroms) | Co Surface area (m$^2$/g reduced catalyst) |
|---|---|---|---|---|---|---|---|---|
| 70 | 70 | Oven | 6.5 | 0 | 136.1 | 0.47 | 138 | 32.8 |
| 60 | 70 | Spray dry | 6.0 | 0 | 112.9 | 0.55 | 195 | 37.0 |
| 55 | 30 | Spray dry | 6.5 | 0 | 217.6 | 0.56 | 103 | 46.5 |
| 50 | 30 | Spray dry | 6.6 | 0 | 186.4 | 0.51 | 109 | 48.8 |
| 40 | 30 | Oven | 6.8 | 0 | 137 | 0.33 | 96 | 34.3 |

The results indicate that under these conditions an optimum temperature range exists ca 50° C.

d) Effect of Ageing Time. A series of experiments was run at Al:Co=0.3, precipitation reactor T=35° C., ageing reactor T=40 or 70° C. and increasing the ageing time from 25-70 minutes. The results are as follows;

| Ageing Temp (° C.) | Ageing time (mins) | pH | Ageing stirring speed | Dry Method | BET SA m$^2$/g | Pore Volume cm$^3$/g | Pore Diameter (Angstroms) | Co Surface area (m$^2$/g reduced catalyst) |
|---|---|---|---|---|---|---|---|---|
| 70 | 70 | 6.5 | 350 | Oven | 136.1 | 0.47 | 138 | 32.8 |
| 70 | 37 | 6.5 | 350 | Spray dry | 145.0 | 0.48 | 132 | 44.5 |
| 70 | 25 | 6.2 | 350 | Oven | 150.2 | 0.37 | 98 | 31.7 |
| 40 | 30 | 6.9 | 200 | Oven | 137.0 | 0.33 | 96 | 34.3 |
| 40 | 40 | 9.9 | 200 | Oven | | | | 33.2 |
| 40 | 50 | 9.9 | 200 | Oven | | | | 33.1 |

The results showed that all Co surface areas were above 30 m$^2$/g reduced catalyst and that the highest Co surface areas were achieved for 70° C. ageing at 35-40 minutes.

e) Effect of Mn Promoter. Manganese Nitrate was mixed with the initial Co nitrate solution. Catalysts were prepared with the following compositions:

| Al/Co atomic ratio | Co/Mn expected | Co/Mn experimental | (Al + Mn)/Co | Al/(Co + Mn) |
|---|---|---|---|---|
| 0.24 | 80 | 80.75 | 0.25 | 0.23 |
| 0.19 | 20 | 19.28 | 0.24 | 0.18 |
| 0.19 | 10 | 12.27 | 0.27 | 0.17 |

-continued

| Al/Co atomic ratio | Co/Mn expected | Co/Mn experimental | (Al + Mn)/Co | Al/(Co + Mn) |
|---|---|---|---|---|
| 0.24 | 5 | 11.81 | 0.32 | 0.22 |
| 0.24 | 5 | 11.91 | 0.32 | 0.22 |

The ageing temperature was 50° C., the ageing time 30 mins, the stirring speed in the ageing reactor was 200 rpm. 50:50 (molar) NaOH/Na$_2$CO$_3$ was used as precipitant and the average pH in the ageing reactor was 8.2 for all of the catalysts. The results were as follows;

| Comments | Dry Method | BET SA $m^2/g$ | Pore Volume $cm^3/g$ | Pore Diameter (Angstroms) | Co Surface area ($m^2/g$ reduced catalyst) |
|---|---|---|---|---|---|
| 1/80 Mn/Co | Oven | 165.1 | 0.71 | 172 | 48.6 |
| 1/80 Mn/Co | Spray dry | 144.0 | 0.80 | 222 | 44.1 |
| 1/20 Mn/Co | Spray dry | | | | 35.5 |
| 1/10 Mn/Co | Spray dry | | | | 34.4 |
| 1/5 Mn/Co | Spray dry | 126.3 | 0.48 | 152 | 43.3 |
| 1/5 Mn/Co | Spray dry | 158.3 | 0.60 | 152 | 45.4 |

The Manganese ratio series may be expected to cause a reduction in cobalt surface area/g reduced catalyst as the amount of Mn is increased. This is indeed observed except for the 1/5 ratio. Mn is a promoter believed to improve catalyst selectivity.

f) Effect of Reduction Temperature on Co Surface Area. A catalyst precursor was prepared under the following conditions: Al/Co atomic ratio=0.3; NaOH/Na$_2$CO$_3$ mole ratio=1:1; Precipitation reactor temperature=35° C.; Ageing reactor temperature=50° C.; Stirring speed of ageing reactor=200 rpm and precipitation reactor=1500 rpm; Ageing time: 30 min; Washed precipitate was oven dried.

The catalyst precursor, without calcination, was reduced at different temperatures under a stream of pure hydrogen and the Co surface area determined at 150° C. using the chemisorption method described above.

| Reduction Temperature (° C.) | Co Surface area ($m^2/g$ reduced catalyst) | Weight loss on reduction (% w/w) |
|---|---|---|
| 380 | 53.2 | 65 |
| 425 | 51.1 | 66 |
| 480 | 47.9 | 67 |

The results indicate acceptable reduction occurs between 380 and 480° C., preferably at lower temperatures. This finding is contrary to the teaching of Khassin et al, which suggests that higher reduction temperatures give higher cobalt surface areas for simultaneously co-precipitated Co—Al catalysts.

Example 4

Catalyst Testing

The catalyst precursor prepared according to the method of Example 3 was calcined at 250° C. in air for 5 hours. The weight loss on calcination was 52.9% w/w. 0.1 grams of the calcined material was dispersed in 1.0 g of 50-100 μm inert silicon carbide and placed in a laboratory tubular (4 mm i.d) reactor. The precursor was reduced using 99% hydrogen, 1% Ar at 380° C./9 hours and then cooled to 100° C. and a mixture of hydrogen and carbon monoxide (H$_2$:CO=2:1) passed over the catalyst. The temperature was increased to 195° C. over 16 hours and then held at this temperature for a period before increasing the temperature to 210° C. for 90-150 hours. The pressure was 20 barg. The space velocity of the feed gas mixture was maintained in order to achieve a conversion of ca 30%. The product gas composition was determined at between 100-150 hours online using gas chromatography using known methods. The product gas stream was analysed for CO$_2$ and methane (CH$_4$) by-products as well as the desired C5+ hydrocarbon products.

A comparative experiment was performed using a standard catalyst comprising, prior to reduction, 20% wt Co and 1% wt Re impregnated on an alumina support. The standard catalyst was prepared by impregnating a gamma alumina (Puralox HP14/150) with a solution of cobalt nitrate and ammonium perrhenate, and oven drying the separated solid at 110° C. for 6.5 hrs before calcination at 200° C. for 1 hour. The catalyst was added at 0.2 g in 1.0 g SiC. The reduction and reaction conditions were the same for both catalysts.

By noting the relative catalyst composition and space velocity required to give the desired conversion it is possible to calculate a relative activity for the catalyst of the present invention. The results are as follows;

| | Standard catalyst | Example 4 catalyst |
|---|---|---|
| Unreduced (oxidic) catalyst Weight (g) | 0.203 | 0.104 |
| Reduction Temp. (° C.) | 380 | 380 |
| Reduction time (mins) | 540 | 540 |
| Reduction space velocity (liter/hr · kg) | 9754 | 19038 |
| Weight loss on reduction (%) | 17.7 | 27.7 |
| Co surface area ($m^2/g$ reduced catalyst) | 14.9 | |
| Reaction Temp. (° C.) | 210 | 210 |
| Pressure (barg) | 20 | 20 |
| Space Velocity (litre/hr · kg) (on unreduced catalyst) | 8867 | 17308 |
| Measured Conversion (Ar on original %) | 33.2 | 30.2 |
| Relative activity (unreduced catalyst) | 1.0 | 1.8 |
| Relative activity (reduced catalyst) | 1.0 | 2.0 |
| CO$_2$ (%) | 0.213 | 0.257 |
| CH$_4$ (%) | 7.16 | 7.81 |
| C5+ (%) | 86.3 | 85.9 |

The results indicate a much higher activity with comparable selectivity for the catalysts of the present invention.

The invention claimed is:

1. A process for the Fischer-Tropsch synthesis of hydrocarbons comprising the step of reacting a mixture of carbon monoxide and hydrogen in the presence of a particulate catalyst comprising a precipitated intimate mixture of precipitated cobalt and aluminum compounds in which the cobalt compounds are supported on cobalt-aluminum compounds, said mixture having a cobalt content ≧60% wt and a cobalt and aluminum at an atomic ratio in the range 10:1 to 2:1 (Co:Al), which when reduced at 425° C., has a cobalt surface area as measured by hydrogen chemisorption at 150° C. of at least 30 $m^2/g$ of catalyst wherein the catalyst is prepared by steps comprising:
(i) precipitating an insoluble cobalt compound from an aqueous solution of a cobalt salt with an excess alkaline precipitating agent,
(ii) adding a soluble aluminum compound,
(iii) aging the resulting precipitate in suspended form,
(iv) recovering and drying the catalyst composition, and
(v) activating the catalyst by reduction using a hydrogen-containing gas.

2. A process according to claim 1 further comprising a step of calcining of the dried catalyst composition.

3. A process according to claim 1 wherein the cobalt salt is selected from the group consisting of a nitrate, sulfate, acetate, chloride and formate.

4. A process according to claim 1 wherein the cobalt salt is cobalt nitrate.

5. A process according to claim 1 wherein the precipitating agent is selected from the group consisting of an alkali metal hydroxide, alkali metal carbonate, alkali metal bicarbonate, ammonium hydroxide, ammonium carbonate, and a mixture thereof.

6. A process according to claim 1 wherein the precipitating agent is selected from the group consisting of sodium hydroxide, sodium carbonate and mixtures thereof.

7. A process according to claim 1 wherein the precipitation is effected at a pH in the range 7-10 at a temperature below 50° C.

8. A process according to claim 1 wherein the soluble aluminum compound is selected from the group consisting of aluminum nitrate, sodium aluminate and alumina that dissolves at least partly in the excess alkali.

9. A process according to claim 8 wherein the soluble aluminum compound is sodium aluminate.

10. A process according to claim 1 wherein aging is performed until >50% of the aluminum is in the form of cobalt aluminum compounds.

11. A process according to claim 1 wherein the aging is performed at a pH in the range of 6-11 at a temperature in the range 10-100° C.

12. A process according to claim 1 wherein the mixture of carbon monoxide and hydrogen used for the Fischer-Tropsch synthesis of hydrocarbons is a synthesis gas having a hydrogen:carbon monoxide ratio in the range 1.7-2.5:1.

13. A process according to claim 1 wherein the Fischer-Tropsch synthesis of hydrocarbons is performed in a continuous or batch process using one or more stirred slurry-phase reactors, bubble-column reactors, loop reactors or fluidized bed reactors.

14. A process according to claim 1 wherein the Fischer-Tropsch synthesis of hydrocarbons is operated at pressures in the range 0.1-10 MPa and temperatures in the range 150-350° C.

15. A process according to claim 1 wherein the Co:Al atomic ratio is in the range 5:1 to 2.5:1.

16. A process according to claim 1 wherein the BET surface area of the catalyst prior to reduction is between 50 and 250 $m^2/g$.

17. A process according to claim 1 wherein the catalyst further comprises one or more additives or promoters.

18. A process according to claim 1 wherein the catalyst further comprises at least one additive selected from the group consisting of compounds of molybdenum, nickel, copper, iron, manganese, titanium, zirconium, lanthanum, cerium, chromium, magnesium, and zinc.

19. A process according to claim 1 wherein the catalyst further comprises at least one promoter selected from the group consisting of rhodium, iridium, ruthenium, rhenium, platinum, and palladium.

* * * * *